(12) United States Patent
Eichler-Johnson et al.

(10) Patent No.: US 8,211,521 B2
(45) Date of Patent: Jul. 3, 2012

(54) LOW APPLICATION TEMPERATURE HOT MELT ADHESIVE COMPOSITION AND ARTICLES INCLUDING THE SAME

(75) Inventors: Beth Eichler-Johnson, St. Paul, MN (US); Vitaly Rogachevsky, Woodbury, MN (US)

(73) Assignee: H.B. Fuller Company, St. Paul, MN (US)

( * ) Notice: Subject to any disclaimer, the term of this patent is extended or adjusted under 35 U.S.C. 154(b) by 284 days.

(21) Appl. No.: 12/270,368

(22) Filed: Nov. 13, 2008

(65) Prior Publication Data

US 2009/0120577 A1 May 14, 2009

Related U.S. Application Data

(60) Provisional application No. 60/987,659, filed on Nov. 13, 2007.

(51) Int. Cl.
   - *B32B 7/10* (2006.01)
   - *B32B 33/00* (2006.01)
   - *B32B 7/12* (2006.01)
   - *B32B 37/12* (2006.01)

(52) U.S. Cl. ...... 428/40.1; 428/40.5; 524/224; 524/275; 524/508; 156/334

(58) Field of Classification Search .................. 524/270, 524/272, 224, 275, 508; 428/40.1, 40.5; 156/334

See application file for complete search history.

(56) References Cited

U.S. PATENT DOCUMENTS

| | | | |
|---|---|---|---|
| 6,107,430 A * | 8/2000 | Dubois et al. | 526/348.5 |
| 6,172,146 B1 | 1/2001 | Yanagishita | |
| 7,199,204 B2 | 4/2007 | Haner et al. | |
| 2005/0090615 A1 * | 4/2005 | Fisher | 525/88 |
| 2006/0135694 A1 * | 6/2006 | Vaughan et al. | 525/88 |
| 2008/0249216 A1 * | 10/2008 | Gong et al. | 524/272 |

FOREIGN PATENT DOCUMENTS

| | | |
|---|---|---|
| EP | 0209956 | 1/1987 |
| EP | 0776 955 | 6/1997 |
| EP | 0934990 | 8/1999 |
| JP | 56-028257 | 3/1981 |
| JP | 04-239083 | 8/1992 |
| JP | 2004-197022 | 7/2004 |
| JP | 2005-187735 | 7/2005 |
| WO | WO 03/095514 | 11/2003 |

OTHER PUBLICATIONS

Lewis, Richard J., Sr. Hawley's Condensed Chemical Dictionary (14$^{th}$ Edition). (pp. 1). John Wiley & Sons. Online version available at: http://www.knovel.com/web/portal/browse/display?.*
Technical Data Sheet for Hikotack P-120, Apr. 2002, Kolon.*
Kolon Chemical Co., Ltd., Kolon Hydrocarbon Resins; Sukorez®, Hikorez®, Hikotack®, KPC-05-002.
H.B. Fuller Company Proprietary Information Submitted under MPEP 724.02.

* cited by examiner

*Primary Examiner* — James J Seidleck
*Assistant Examiner* — Deve E Valdez
(74) *Attorney, Agent, or Firm* — Kirsten Stone; Kristi Halloran

(57) ABSTRACT

A hot melt adhesive composition that includes a first tackifying agent that includes phenol-modified aromatic hydrocarbon resin, thermoplastic polymer that includes ethylene copolymer, and a first wax.

20 Claims, No Drawings

LOW APPLICATION TEMPERATURE HOT MELT ADHESIVE COMPOSITION AND ARTICLES INCLUDING THE SAME

CROSS-REFERENCE TO RELATED APPLICATIONS

This application claims the benefit of U.S. Provisional Application Ser. No. 60/987,659, filed on Nov. 13, 2007, which is incorporated herein.

BACKGROUND

The invention relates to a low application temperature hot melt adhesive composition. It would be desirable to achieve a low application temperature hot melt adhesive composition in which types and sources of raw material can be substituted for one another while maintaining an adhesive composition that can form fiber tearing bonds at temperatures from about 4.4° C. (40° F.) to about 48.9° C. (120° F.).

SUMMARY

In one aspect, the invention features a hot melt adhesive composition that includes thermoplastic polymer comprising ethylene copolymer, a first tackifying agent that includes phenol-modified aromatic hydrocarbon resin, and a first wax. In one embodiment, the composition further includes a second tackifying agent different from the first tackifying agent. In another embodiment, the composition further includes a second wax different from the first wax. In some embodiments, the composition exhibits a viscosity of no greater than about 6000 centipoise (cps) at 149° C. (300° F.). In other embodiments, the composition exhibits a viscosity of no greater than about 3500 cps at 149° C. (300° F.). In some embodiments, the composition exhibits a viscosity of no greater than about 3000 cps at 149° C. (300° F.). In another embodiment, the composition exhibits a viscosity no greater than about 1500 cps at 135° C. (275° F.).

In other embodiments, the composition exhibits at least 40% fiber tear when tested according to the Fiber Tear test method in which the application temperature is 135° C. (275° F.) and the test temperature is 48.9° C. (120° F.).

In other embodiments, the composition exhibits at least 40% fiber tear when tested according to the Fiber Tear test method in which the application temperature is 149° C. (300° F.) and the test temperature is 48.9° C. (120° F.).

In some embodiments, the second tackifying agent includes at least one of rosin ester, rosin acid, styrenated terpene, terpene-phenolic resin, aliphatic hydrocarbon resin, aromatic-modified aliphatic resin, aromatic hydrocarbon resin, α-methyl styrene resin, hydrogenated hydrocarbon resin, and aromatically-modified hydrocarbon resin.

In another embodiment, the first and second waxes are selected from the group consisting of paraffin waxes, Fischer-Tropsch waxes, by-product polyethylene waxes, high-density low molecular weight polyethylene waxes, microcrystalline waxes, vegetable waxes, and combinations thereof.

In some embodiments, the first wax is selected from the group consisting of paraffin waxes, Fischer-Tropsch waxes, and combinations thereof. In other embodiments, the first wax has a melting point of no greater than 83° C. and a needle penetration of no greater than 27 decimillimeter (dmm) at 25° C.

In some embodiments, the second wax is selected from the group consisting of Fischer-Tropsch waxes, by-product polyethylene waxes, high-density low molecular weight polyethylene waxes, microcrystalline waxes, and combinations thereof.

In other embodiments, the second wax has a melting point that is greater than the melting point of the first wax.

In some embodiments, the composition exhibits a peel adhesion failure temperature of at least 50° C. (122° F.).

In other embodiments, the ethylene-copolymer includes ethylene vinyl acetate. In some embodiments, the ethylene-copolymer includes at least one of ethylene-n-butyl acrylate, ethylene methyl methacrylate, ethylene ethyl methacrylate, ethylene 2-ethylhexyl acrylate, ethylene methacrylate, ethylene ethylacrylate, and ethylene acrylic acid.

In one embodiment, the composition, when heated to 135° C. (275° F.), is clear as determined by the unaided eye. In another embodiment, the composition, when heated to 149° C. (300° F.), is clear as determined by the unaided eye.

In another aspect, the invention features a method of making a construction, the method including applying a hot melt adhesive composition disclosed herein on a first substrate, and contacting the applied hot melt adhesive with a second substrate such that the first substrate is bonded to the second substrate through the adhesive composition, the adhesive composition exhibiting a fiber tearing bond to the first and second substrates. In some embodiments, the substrate includes at least one of paperboard, corrugated paperboard, cardboard, and coated cardboard. In another embodiment, the substrate includes at least one of paper and coverstock.

In other aspects, the invention features a method of packaging an article, the method including filling a package with the article, and applying a hot melt adhesive composition disclosed herein on a first surface of the package. In one embodiment, the method further includes contacting the applied hot melt adhesive composition with a second surface. In other embodiments, the substrate is a second surface of the package.

In other aspects, the invention features a packaging construction made or sealed with the composition disclosed herein. The packaging construction is selected from a group consisting of a bag, box, carton, case and tray.

In still other aspects, the invention features both a method of making a bound book (e.g. magazine, soft cover and hardcover) using the compositions disclosed herein and the bound book comprising the composition disclosed herein.

The invention features a hot melt adhesive composition that can be applied at low temperatures, and maintains a good bond to a cellulose-based substrate. The hot melt adhesive can be formulated with a variety of different paraffin waxes to exhibit a peel adhesion temperature useful for many applications.

Other features and advantages will be apparent from the following description of the preferred embodiments and from the claims.

DETAILED DESCRIPTION

The hot melt adhesive composition includes a thermoplastic polymer that includes an ethylene copolymer, a first tackifying agent, and a first wax. The hot melt adhesive composition can be applied at low application temperatures. One measure of the ability of a hot melt adhesive composition to be applied at a low application temperature is its melt viscosity. The hot melt adhesive composition preferably exhibits a viscosity of no greater than about 6000 cps at 149° C. (300° F.). In other embodiments, the composition exhibits a viscosity of no greater than about 3500 cps at 149° C. (300° F.), no greater than about 3000 cps at 149° C. (300° F.), no greater than about 2000 cps at 149° C. (300° F.), no greater than about 1500 cps at 149° C. (300° F.), no greater than about 2000 cps at 135° C. (275° F.), or even no greater than about 1500 cps at 135° C. (275° F.) or even 121° C. (250° F.).

The hot melt adhesive composition also exhibits good resistance to heat and cold. One useful measure of heat resistance is the ability to maintain a bond at elevated temperatures. The hot melt adhesive composition preferably exhibits a fiber-tearing bond at a temperature of at least 4.4° C. (40° F.), at least 25° C. (77° F.) or even at least 49° C. (120° F.). A fiber tearing bond is one in which fibers cover at least a portion of the area of the adhesive composition after two substrates that have been previously bonded together through the adhesive composition are separated by force. One useful measure of cold resistance is the ability to maintain a bond at 4.4° C. (40° F.). The hot melt adhesive composition preferably exhibits a fiber-tearing bond at 4.4° C. (40° F.).

The components of the hot melt adhesive composition preferably are compatible with each other. One measure of component compatibility in a hot melt adhesive composition is the clarity of the hot melt adhesive composition. The hot melt adhesive composition preferably is visually clear, i.e., not cloudy, as determined by the unaided eye when heated to a temperature of at least 121° C. (250° F.) or even at least 135° C. (275° F.), or even at least 149° C. (300° F.).

The first tackifying agent is a phenol-modified aromatic hydrocarbon resin having a softening point of from 115° C. (239° F.) to 125° C. (257° F.), or even 120° C. (248° F.), as determined according to ASTM E28. A useful phenol-modified C9 aromatic hydrocarbon resin is commercially available under the trade designation HIKOTACK P120P from Kolon Chemical Company LTD (Kwacheon City, Korea). HIKOTACK P120P phenol-modified C9 aromatic petroleum hydrocarbon resin, has a softening point of from 115° C. (239° F.) to 125° C. (257° F.) (as determined according to ASTM E28), a maximum Gardner Color No. of 8 (as determined according to ASTM D 1544), a maximum acid value of 0.1 KOH mg/g (as determined according to ASTM D 974), and a maximum bromine number of 30 BrCg/g (as determined according to ASTM D 1159), all of which are as reported by the manufacturer. The phenol-modified aromatic hydrocarbon resin is preferably present in the composition in an amount no greater than about 45% by weight, no greater than about 30% by weight, or even no greater than about 25% by weight.

The composition can include an optional second tackifying agent that is different from the first tackifying agent. The second tackifying agent preferably is compatible with the hot melt adhesive composition, and preferably assists in rendering the first tackifying agent compatible with the hot melt adhesive composition. Suitable tackifying agents have a Ring and Ball softening point greater than 60° C., examples of which include natural and modified rosins such as gum rosin, wood rosin, tall oil rosin, distilled rosin, hydrogenated rosin, dimerized rosin and polymerized rosin; rosin esters such as glycerol and pentaerythritol esters of natural and modified rosins including, e.g., glycerol esters of pale, wood rosin, glycerol esters of hydrogenated rosin, glycerol esters of polymerized rosin, pentaerythritol esters of hydrogenated rosin and phenolic-modified pentaerythritol esters of rosin; phenolic modified terpene or alpha methyl styrene resins and hydrogenated derivatives thereof including, e.g., the resin product resulting from the condensation in an acidic medium of a bicyclic terpene and a phenol; aliphatic petroleum hydrocarbon resins having a Ball and Ring softening point of from about 70° C. to 135° C.; the latter resins resulting from the polymerization of monomers consisting primarily of olefins and diolefins; including hydrogenated aliphatic petroleum hydrocarbon resins; aromatic petroleum hydrocarbon resins, and mixed aromatic and aliphatic paraffin hydrocarbon resins and the hydrogenated derivatives thereof; aromatic modified alicyclic petroleum hydrocarbon resins and the hydrogenated derivatives thereof; alicyclic petroleum hydrocarbon resins and the hydrogenated derivatives thereof; styrenated terpenes; and combinations thereof.

Examples of useful commercially available tackifying agents include resins available under the trade designations SYLVALITE RE 100L pentaerythritol ester of rosin, SYLVAREZ TP2040 terpene-phenolic resins, and ZONATAC M106 styrenated terpene resin, all of which are available from Arizona Chemical (Jacksonville, Fla.), FORAL, FORAL AX-E, KRISTALEX (e.g., KRISTALEX 3100 α-methyl styrene resin) and ENDEX resins from Eastman Chemical (Kingsport, Tenn.), ESCOREZ 5000 series of hydrogenated cyclic hydrocarbon resins, ESCOREZ 1000 series aliphatic hydrocarbon resins, and ESCOREZ 2000 series aromatically modified hydrocarbon resins all of which are available from ExxonMobil Chemical (Houston, Tex.), and HIKOTACK P120 aromatic hydrocarbon resin from Kolon Chemical, (Kwacheon City, South Korea).

The second tackifying agent, when present in the composition, preferably is present in an amount of from about 5% by weight to about 50% by weight, from about 15% by weight to about 40% by weight, or even from about 15% by weight to about 30% by weight.

The term "ethylene copolymer," as used herein, refers to copolymers and terpolymers of ethylene. Examples of useful ethylene copolymers include ethylene vinyl acetate, ethylene methyl acrylate, ethylene ethyl acrylate, ethylene n-butyl acrylate, ethylene acrylic acid, ethylene methacrylate, ethylene methyl-methacrylate, ethylene 2 ethylhexyl acrylate, and combinations thereof.

Useful ethylene vinyl acetate copolymers exhibit a melt index of less than about 2600 g/10 min, or even less than about 1100 g/10 min. Suitable ethylene vinyl acetate copolymers also include a vinyl acetate content of at least 18% by weight, at least 25% by weight, at least about 40% by weight, from about 18% by weight to about 50% by weight, or even from about 25% by weight to about 50% by weight. Suitable copolymers of ethylene vinyl acetate are commercially available under the ATEVA series of trade designations including ATEVA 1850A, 1880A, 2830A, 2850A and 4030AC from AT Plastics, Inc. (Edmonton, Alberta, Canada), under the LEVAMELT series of trade designations including, e.g., LEVAMELT 800 and LEVAMELT KA8896 from Bayer Corporation (Pittsburgh, Pa.), and the ESCORENE series of trade designations including, e.g., ESCORENE MV02514 and UL8705 from ExxonMobil Chemical Company (Houston, Tex.).

Useful ethylene methyl-methacrylate copolymers include methyl-methacrylate in an amount of from about 18% by weight to about 40% by weight of the ethylene methyl-methacrylate copolymer. Suitable ethylene methyl-methacrylate copolymers exhibit a melt index less than about 1100 g/10 min, or even less than about 900 g/10 min. Useful ethylene methyl-methacrylate copolymers are commercially available under the ACRYFT trade designations including ACRYFT WK601 and WK602 from Sumitomo Chemical Company (Tokyo, Japan).

The hot melt adhesive composition preferably includes from about 20% by weight to about 50% by weight, or even from about 20% by weight to about 40% by weight ethylene copolymer.

Useful classes of first and second waxes include, e.g., paraffin waxes, Fischer-Tropsch waxes, by-product polyethylene waxes, high-density low molecular weight polyethylene waxes, microcrystalline waxes, and vegetable waxes.

Paraffin waxes and microcrystalline waxes are refined from crude oil. In one embodiment, useful paraffin waxes contain from about 40% to about 90% of normal alkanes. Useful paraffin waxes have a softening point of less than about 80° C., or even less than about 75° C. and contain less than about 3.0% by weight oil, or even less than about 2.0% by weight oil. Useful microcrystalline waxes contain iso (branched) or cyclo-alkanes. Useful microcrystalline waxes have a softening point of less than about 93° C. (200° F.).

Fischer-Tropsch waxes are those waxes produced by Fischer-Tropsch synthesis including e.g., a catalyzed chemical reaction in which synthesis gas (i.e. syngas), a mixture of carbon monoxide and hydrogen, is converted into liquid hydrocarbons of various lengths. Useful Fischer-Tropsch waxes have a softening point of less than about 225° C.

By-product polyethylene waxes result from refining the waste stream resulting from the production of high density polyethylene polymers. By-product polyethylene waxes typically have a broad molecular weight distribution. Useful by-product polyethylene waxes have a softening point of no greater than about 225° C.

High-density low molecular weight polyethylene waxes are manufactured by the controlled thermal degradation of high density polyethylene, or by direct synthesis to a spectrum of low molecular weight single cuts. The high-density low molecular weight polyethylene waxes useful in this invention have a softening point of no Greater than about 225° C.

Vegetable wax is often produced from the hydrogenation of a vegetable derived oil including, e.g., soybean oil, castor oil and combinations thereof.

Preferably the first wax has a melt point of less than 83° C., or even less than 75° C. (as determined using Differential Scanning Calorimetry (DSC) according to ASTM D87-04 entitled, "Standard Test Method for Melting Point of Petroleum Wax (Cooling Curve)"), and a maximum Needle penetration of no greater than 27 decimillimeters (dmm), or even no greater than 24 dmm, at 25° C. (as determined according to ASTM D321-04 entitled, "Standard Test Method for Needle Penetration of Petroleum Waxes"). Preferred first waxes are commercially available from a variety of sources under a variety of trade designations including, e.g., PACEMAKER 155 paraffin wax from Citgo Petroleum (Houston. Tex.), SARAWAX SX-70 Fischer-Tropsch wax from Shell MDS (Bintulu, Malaysia), FRP 64/66 paraffin wax from HCI (Jingmen, China), CALUMET SC6519 paraffin wax from Calumet Lubricants Company (Indianapolis, Ind.) (Calumet (Shreveport, La. Calumet, Ill.), PARVAN 1520 paraffin wax from ExxonMobil Company (Dallas, Tex.), IGI 5812A microcrystalline wax from IGI, Inc. (Agincourt, Ontario, Canada).

The first wax is preferably present in the hot melt adhesive composition in an amount from about 5% by weight to about 50% by weight, or even from about 10% by weight to about 45% by weight, or even from about 20% by weight to about 40% by weight.

The composition can optionally include a second wax that is different from the first wax. In one embodiment, the second wax has a higher melting point than the first wax. Preferred second waxes include, e.g., low molecular weight polyethylene waxes commercially available under the trade designations PETROLITE C-4040 and POLYWAX 1000, 2000, and 3000 from Baker Petrolite Corporation (Sugarland, Tex.), low molecular weight by-product polyethylene waxes commercially available under the trade designation MARCUS 100, 200 and 300, from Marcus Chemical Co., a Division of H.R.D. Corp. (Houston, Tex.), Fischer-Tropsch waxes commercially available under the trade designations PARAFLINT H-1, H-4 and H-8 from Sasol-SA/Moore & Munger (Shelton, Conn.), and BARECO PX-105, from Baker Petrolite Corporation (Sugarland, Tex.), and microcrystalline wax commercially available under the trade designation BE-SQUARE 195 from Baker Petrolite Corporation.

The second wax, when present in the composition, is present in an amount no greater than about 25% by weight, no greater than about 20% by weight, no greater than about 15% by weight or even no greater than about 10% by weight.

The composition can optionally include other additives including e.g., antioxidants, plasticizers, pigments, fillers, dyes, UV and thermal stabilizers, and combinations thereof. Useful antioxidants include hindered phenolic antioxidants, examples of which are commercially available under the IRGANOX series of trade designations including IRGANOX 565, IRGANOX 1010 and IRGANOX 1076 from Ciba Specialty Chemicals (Basel, Switzerland). The composition preferably includes antioxidant in an amount of from about 0% by weight to about 2% by weight.

The adhesive composition is well suited to use in packaging applications including, e.g., forming seals, seams and destructive bonds between two or more substrates. The hot melt adhesive composition can be applied to a variety of substrates and is particularly useful in bonding a first substrate to a second substrate through the hot melt adhesive composition. Suitable substrates include virgin and recycled cellulose-based substrates including, e.g., paper, kraft paper, cover stock, paperboard, corrugated paperboard, cardboard, corrugated cardboard, chipboard, and solid fiber paper board, as well as the aforementioned substrates with treated surfaces including, e.g., coatings (e.g., coated Kraft paper, coated K-aft paperboard, and coated cardboard), film, laminates, foil, metallized surfaces, and combinations thereof.

Coatings often used to treat cellulose-based substrates include, e.g., wax (e.g., paraffin wax), lipids, zein (i.e., alcohol soluble protein derived from corn), clay, polymer, and combinations thereof.

Useful polymers for preparing polymer films include, e.g., polyethylene, polypropylene, polyester, mylar, polyvinylidene chloride, ethylene vinyl acetate, and combinations thereof, and multilayer constructions thereof. Examples of common polyethylene films include high density polyethylene, medium density polyethylene, linear low density polyethylene, and low density polyethylene.

Aluminum is a common metal used in forming foils, although other metals are suitable including, e.g., gold, silver, chromium, tin, copper, zinc, and combinations thereof.

Laminates include multiple layers of a variety of materials including, e.g., metal, polymer, cellulous-based sheets, polymer film, and combinations thereof. Metallized polymer films have a metallized surface layer deposited on a polymer film. Metallization, which occurs directly on the polymer film, can be accomplished by any suitable metallizing process including, e.g., vacuum deposition, electroplating, sputtering and combinations thereof. Aluminum is a common metal used in metallized films, although other metals are suitable including, e.g., gold, silver, chromium, tin, copper, zinc, and combinations thereof.

Suitable metallized polymer films include, e.g., metallized polyester, metallized polyolefin (e.g., polypropylene, polyethylene, polypropylene homopolymer, ethylene propylene random copolymer, ethylene propylene butylene terpolymer, and propylene butylene copolymer), ethyl vinyl alcohol copolymers. Useful polymer films include the above-described polyethylene films.

The metallized polymer film can include multiple layers, i.e., multilayer film, of polymer, adhesive, metal and various combinations thereof. The metallized polymer film can also be a component of a construction that includes, e.g., multiple substrates, multiple layers, a variety of different materials, and combinations thereof.

The hot melt adhesive composition is suitable for use in a variety of applications including bookbinding (e.g., magazines, soft cover books and hard cover books). The compositions are useful for both one-shot and two-shot bookbinding. The compositions are further suitable for other book construction applications (e.g., side gluing, back lining, joint adhesive and tight backing).

In one-shot bookbinding the pages of a book are gathered together, the edge to be bound is trimmed, and one layer (i.e. one-shot) of adhesive is applied to the trimmed, gathered pages. The adhesive The adhesive is applied using any suitable coating technique including, e.g., In one embodiment, the adhesive is applied by roll coating. Preferably, immediately after the adhesive is applied, a cover is placed over the exposed surface of the adhesive and pressure is applied to form a bond. The one-shot adhesive has two functions, to holds the pages together and to adheres the cover to the spine. One-shot bookbinding is useful for manufacturing a variety of articles including, e.g., commonly used in the manufacture of magazines and soft cover books.

In two-shot bookbinding, two separate layers (i.e. two-shots) of adhesive are applied to the backbone of the book. The two separate layers of adhesive are used to add extra strength to the backbone of the book. The two separate layers may be the same adhesive or they may be two different adhesives. In some embodiments, one layer of adhesive holds the pages of the book together (i.e. the primer) and the second layer of adhesive holds the cover in place (i.e. covering glue or second shot adhesive). In other embodiments (e.g. hard cover bookbinding) the two separate layers of adhesive are used to form the book block (i.e. the block of pages with no cover) and the cover is applied in a separate process. The compositions disclosed herein are useful as both a primer and a second shot adhesive. Two-shot bookbinding is useful for manufacturing a variety of articles including, e.g., magazines, soft cover books and hard cover books.

The book binding process also optionally includes applying a side glue adhesive. Side glue is applied parallel to the spine along the side of the book block immediately adjacent to the covering glue. The purpose of the side glue is to hold the cover (e.g. soft cover, magazine cover) in place to form a hinge.

Various additional adhesives can optionally be are applied during the construction of a hard cover book to add strength to the final book including, e.g., back lining adhesives, tight backing adhesives, joint adhesives and combinations thereof, Back lining adhesives can be used to strengthen a bound book block by adhering additional layers of material (e.g. paper (e.g. kraft paper), scrim and combinations thereof) to the backbone prior to a hard cover being applied. A tight backing adhesive can be used to attach the backbone of a book block to a hard cover. A joint adhesive can be used to strengthen the area where the hard cover flexes, as the book is opened The hot melt composition is also suitable for use in filters (e.g., bonding a filter medium to a filter frame and maintaining pleats (i.e., folds) of a pleated filter media in a fixed, spaced apart relation to one another).

The hot melt composition is particularly suitable for the formation of packaging constrictions including, e.g., bags, boxes (e.g. beverage (e.g., beer, soda, etc), and cereal boxes), cartons, cases (e.g. carrying cases), trays, and combinations thereof, and sealing applications including, e.g., case and carton sealing.

In one embodiment, the composition is particularly useful for sift proof case and carton sealing. In a sift-proof application, a powdered substance e.g. pancake mix, flour, etc. is sealed directly into a carton with no other containment i.e. there is no bag within the carton. The hot melt case and carton sealing adhesive needs to seal the box thoroughly enough to prevent any of the powder from escaping.

The hot melt adhesive composition preferably forms a fiber-tearing bond to at least one of the substrates of the packaging construction.

The hot melt adhesive composition can be applied to a substrate using a variety of hot melt application techniques including, e.g., extrusion (e.g., bead applicator), roll coating, and slot nozzle coating. In one application method, the hot melt adhesive composition is extruded through a nozzle onto a substrate and then contacted with a second substrate. As the composition cools, the first substrate forms a bond to the second substrate through the hot melt adhesive composition. In another application method, the hot melt adhesive composition is applied to a roller, transferred from the roller to a first substrate, and then contacted with a second substrate. As the composition cools, the first substrate forms a bond to the second substrate through the hot melt adhesive composition.

The hot melt adhesive composition can be applied in a variety of forms including, e.g., a bead, continuous, discontinuous (e.g., intermittently (e.g., dots and dashes)), pattern, randomly, and combinations thereof.

The invention will now be described by way of the following examples. All ratios and percentages are by weight unless otherwise indicated.

EXAMPLES

Test Procedures

Test procedures used in the examples include the following.

Melting Point Test Method.

Melting point is determined using Differential Scanning Calorimetry according to ASTM D87-07 entitled, "Standard Test Method for Melting Point of Petroleum Wax (Cooling Curve)" (2007).

Needle Penetration Test Method

Needle penetration is determined according to ASTM D1321 entitled, "Standard Test Method for Needle Penetration of Petroleum Waxes," Nov. 1, 1997.

Melt index ("MI") Test Method

Melt index is measured in accordance with ASTM D-1238, condition 190° C., using a 2.16 kg weight (which is formally known as condition E) and reported in units of grams per 10 minutes (g/10 nm in).

Peel Adhesion Failure Temperature ("PAFT") Test Method

The peel adhesion failure temperature ("PAFT") is the temperature in degrees Celsius at which the bond of the sample fails. PAFT is measured in accordance with the PAFT test in ASTM D-4498 with the exception that the thickness of the test piece sandwich is 10 mil and the oven temperature is increased automatically rather than manually.

Shear Adhesion Failure Temperature ("SAFT") Test Method

The shear adhesion failure temperature ("SAFT") is the temperature in degrees Celsius at which the bond of the sample fails. SAFT is measured in accordance with the SAFT test in ASTM D-4498 with the exception that the thickness of the test piece sandwich is 10 mil and the oven temperature is increased automatically rather than manually.

Viscosity Test Method

Viscosity is determined in accordance with ASTM D-3236 entitled, "Standard Test Method for Apparent Viscosity of Hot Melt Adhesives and Coating Materials," (Oct. 31, 1988). Melt viscosities are determined on a Brookfield Thermosel Viscometer Model LVDV 2+ using an appropriate spindle, and reported in centipoise ("cps").

Heat Aged Viscosity Test Method

A 200-gram sample is placed in a 400-ml glass beaker and allowed to stand in an oven at the specified temperature for 200 hours. The glass beaker is left uncovered and samples are removed from the beaker after 96 hours and 200 hours. The color of the sample and the viscosity of the sample at the specified temperature are then determined in accordance with the procedure set forth in ASTM D-4499 entitled, "Standard Test Method for Heat Stability of Hot-Melt Adhesives," (2000), and reported in centipoises ("cps"). The sample is observed for clarity, skin formation, gelation, and charring according to the procedure set forth in ASTM D-4499 (2000) and the observations are reported.

Fiber Tear Test Method

Fiber tear measures the percentage of fiber that covers the area of the adhesive after two substrates, which have been previously bonded together through the adhesive, are separated by force. The percentage of fiber tear is determined as follows. A bead of adhesive composition measuring 15.24 cm (6 inch)×0.24 cm (3/32 inch) is applied to a first substrate of Inland high performance 57 pound 100% virgin liner board, using a Waldorf bond simulator at the specified application temperature. Two seconds after the bead of adhesive is applied to the first substrate, the bead of adhesive is contacted with a second substrate of Inland high performance 57 pound 100% virgin liner board, which is pressed against the adhesive and the first substrate with a pressure of 0.21 Mpa (30 pounds per square inch (psi)) for a period of 2 seconds. The resulting construction is then conditioned at the specified test temperature for at least 24 hours, and then the substrates of the construction are separated from one another by pulling the two substrates apart from one another by hand. The surface of the adhesive composition is observed and the percent of the surface area of the adhesive composition that is covered by fibers is determined and recorded. A mini mum of six samples are prepared and tested for each hot melt adhesive composition.

Softening Point ("SP") Test Method

Softening point is determined according to ASTM D-3461 test method entitled, "Standard Test Method for Softening Point of Asphalt and Pitch (Mettler Cup-and-Ball Method)," dated 1997.

Example 1

The hot melt adhesive composition of Example 1 is prepared in a 350-g batch by sequentially adding 34% by weight ATEVA 2850A ethylene vinyl acetate copolymer having a vinyl acetate content of 28% and a melt index of 850 g/10 min (AT Plastics Inc., Edmonton, Alberta, Canada), 19% by weight HIKOTACK P120P phenol-modified aromatic hydrocarbon resin having a 120° C. softening point as determined by ASTM E28 (Kolon Chemical Company LTD, Kwacheon City, Korea), 27% by weight PACEMAKER 155 paraffin wax having a melting point of 155° F. as determined by ASTM D0127 (Citgo Petroleum Corporation, Houston, Tex.), 19.8% by weight SYLVALITE RE 100L pentaerithrytol rosin ester having a 100° C. softening point as determined according to ASTM E28 (Arizona Chemical, Jacksonville, Fla.), and 0.2% by weight IRGANOX 1076 hindered-phenol antioxidant (Ciba Specialty Chemicals, Basel, Switzerland) to a metal can. The can is then placed in an oven at a temperature of 177° C. until the ingredients are molten. Once the composition is molten, the can is placed in a heating mantle (Glas-Col, Terre Haute, Ind.), which maintains the temperature of the composition at around 150° C., and the composition is mixed with an upright Stirrer Type RZRI mixer (Caframo, Wiarton, Ontario, Canada). Mixing a is continued until a smooth and homogeneous molten composition is achieved.

The hot melt adhesive compositions of Examples 2-10 are prepared according to the method described in Example 1 with the exception that the components and percent by weight thereof are as set forth in Table 1.

Comparative 1 and Control 1

The hot melt adhesive compositions of Comparative 1 and Control 1 are prepared according to the method described in Example 1 with the exception that the components and percent by weight thereof are as set forth in Table 1.

TABLE 1

| Component | Control 1 | Comparative 1 | Example 1 | Example 2 | Example 3 | Example 4 | Example 5 | Example 6 | Example 7 | Example 8 | Example 9 | Example 10 |
|---|---|---|---|---|---|---|---|---|---|---|---|---|
| Ethylene vinyl acetate[1] | 36 | 36 | 34 | 34 | 34 | 34 | 34 | 34 | 34 | 31 | 32 | 33 |
| Phenol-Modified Resin[2] | 0 | 0 | 19 | 19 | 19 | 19 | 19 | 19 | 19 | 20 | 20 | 20 |
| Tackifying Resin[3] | 18.8 | 18.8 | 19.8 | 19.8 | 19.8 | 19.8 | 19.8 | 19.8 | 19.8 | 21.8 | 20.8 | 19.8 |
| Tackifying Resin[4] | 19 | 19 | 0 | 0 | 0 | 0 | 0 | 0 | 0 | 0 | 0 | 0 |
| Wax | 26[5] | 26[6] | 27[5] | 27[6] | 27[7] | 27[8] | 27[9] | 27[5] | 27[6] | 27[5] | 27[5] | 27[5] |
| Antoxidant[10] | 0.2 | 0.2 | 0.2 | 0.2 | 0.2 | 0.2 | 0.2 | 0.2 | 0.2 | 0.2 | 0.2 | 0.2 |

[1]= ATEVA 2805 Ethylene vinyl acetate copolymer (AT Plastics, Inc., Edmonton, Alberta, Canada)
[2]= HIKOTACK P120P phenol-modified aromatic hydrocarbon resin (Kolon, Kwacheon City, South Korea)
[3]= SYLVALITE RE 100L pentaerythritol ester of rosin tackifying agent (Arizona Chemical, Jacksonville, Florida)
[4]= KRISTALEX 3100 α-methyl styrene hydrocarbon resin (Eastman Chemical, Kingsport, Tennessee)
[5]= PACEMAKER 155 paraffin wax (Citgo Petroleum, Houston. Texas),
[6]= SARAWAX SX-70 wax (Shell MDS, Bintulu, Malaysia).
[7]= FRP 64/66 paraffin wax (HCI, Jingmen, China).
[8]= PARVAN 1520 paraffin wax (ExxonMobil Petroleum, Dallas, Texas).
[9]= CALUMET SC6519 paraffin wax (Calumet, Calumet, Illinois)
[10]= IRGANOX 1076 antioxidant (Ciba Specialty Chemicals)

Example 11

The hot melt adhesive composition of Example 11 is prepared in a 350-g batch according to the method of Example 1 with the exception that the materials and amounts thereof are as follows: 34% by weight ATEVA 2850A ethylene vinyl acetate copolymer, 38.8% by weight HIKOTACK P120P phenol-modified aromatic hydrocarbon resin, 27% by weight PACEMAKER 155 paraffin wax, and 0.2% by weight IRGANOX 1076 hindered-phenol antioxidant.

Example 12

The hot melt adhesive composition of Example 12 is prepared in a 350-g batch according to the method of Example 1 with the exception that the materials and amounts thereof are as follows: 34% by weight ACRYFT 28-800 ethylene methylmethacrylate (Sumitomo Chemical Company, Tokyo, Japan), 19% by weight HIKOTACK P120P phenol-modified aromatic hydrocarbon resin, 27% by weight PACEMAKER 155 paraffin wax, 19.8% by weight SYLVALITE RE 100L pentaerithrytol rosin ester, and 0.2% by weight IRGANOX 1076 hindered-phenol antioxidant.

Example 13

The hot melt adhesive composition of Example 13 is prepared in a 350-g batch by sequentially adding 21.5% by weight ATEVA 2842A ethylene vinyl acetate copolymer having a vinyl acetate content of 28% and a melt index of 400 g/110 min (AT Plastics Inc., Edmonton, Alberta, Canada), 24.85% by weight HIKOTACK P120P phenol-modified aromatic hydrocarbon resin having a 120° C. softening point as determined by ASTM E28 (Kolon Chemical Company LTD, Kwacheon City, Korea), 14% by weight PACEMAKER 155 paraffin wax having a melting point of 155° F. as determined by ASTM D0127 (Citgo Petroleum Corporation, Houston, Tex.), 24.85% by weight SYLVALITE RE 100L pentaerithrytol rosin ester having a 100° C. softening point as determined according to ASTM E28 (Arizona Chemical, Jacksonville, Fla.), 6% by weight BARECO PX-105 polyethylene wax and 0.2% by weight IRGANOX 1076 hindered-phenol antioxidant (Ciba Specialty Chemicals, Basel, Switzerland) to a metal can. The can is then placed in an oven at a temperature of 177° C. until the composition is molten. Once the ingredients are molten, the can is placed in a heating mantle (Glas-Col, Terre Haute, Ind.), which maintains the temperature of the composition at around 150° C., and the composition is mixed with an upright Stirrer Type RZRI mixer (Caframo, Wiarton, Ontario, Canada). Then, 6% by weight of ATEVA 2810A ethylene vinyl acetate copolymer having vinyl acetate content of 28% and a melt index of 6 g/10 min (AT Plastics Inc., Edmonton, Alberta, Canada) is added slowly to the composition while the composition is mixing. Mixing is continued until a smooth and homogeneous molten composition is achieved.

The compositions of Comparative 1, Control 1, and Examples 1-13, when tested according to the Viscosity, Heat Aging Viscosity, Softening Point, PAFT, SAFT, and Fiber Tear test methods, are expected to exhibit the properties set forth in Tables 2 and 3. The compositions of Comparative 1, Control 1, and Examples 1-7, 11 and 12 are applied to the test substrates at 275° F. (135° C.) for the Fiber Tear Test Method, and are aged at 275° F. (135° C.) for the Heat Aged Viscosity test method. The compositions of Examples 8-10 are applied to the test substrates at 250° F. (1121° C.) for the Fiber Tear Test Method, and are aged at 250° F. (121° C.) for the Heat Aged Viscosity test method.

TABLE 2

| Sample | Viscosity (cps) | | | Softening Point (° F.) | PAFT (° F.) | SAFT (° F.) | Fiber Tear (%) | | | | | |
|---|---|---|---|---|---|---|---|---|---|---|---|---|
| | 250° F. | 275° F. | 300° F. | | | | 0° F. | 40° F. | 77° F. | 120° F. | 130° F. | 140° F. |
| Control 1 | 1679 | 1092 | NT | 165 | 118 | 148 | 0 | 94 | 100 | 24 | 18 | NT |
| Comparative 1 | 1574 | 1023 | 670 | 167 | 124 | 156 | 0 | 91 | 99 | 91 | 85 | NT |
| 1 | 1457 | 926 | 622 | 163 | 123 | 148 | 0 | 90 | 100 | 84 | 78 | NT |
| 2 | 1414 | 887 | 587 | 170 | 128 | 155 | 0 | 70 | 100 | 100 | 95 | NT |
| 3 | 1359 | 882 | 584 | 160 | 120 | 144 | 0 | 90 | 98 | 66 | 58 | NT |
| 4 | 1621 | 1002 | 658 | 164 | 127 | 147 | 0 | 90 | 99 | 95 | 89 | NT |
| 5 | 1461 | 918 | 612 | 160 | 125 | 144 | 0 | 98 | 98 | 68 | 65 | NT |
| 6 | 1652 | 1031 | 666 | 170.1 | 124 | 148 | 0 | 75 | 99 | 33 | NT | 43 |
| 7 | 1566 | 988 | 635 | 171.5 | 132 | 155 | 0 | 65 | 100 | 76 | NT | 75 |
| 8 | 1215 | 778 | NT | 168.9 | 126 | 147 | 0 | 30 | 100 | 18 | NT | 19 |
| 9 | 1256 | 787 | NT | 165.5 | 125 | 147 | 0 | 59 | 100 | 19 | NT | 16 |
| 10 | 1382 | 896 | NT | 165.1 | 124 | 148 | 0 | 63 | 100 | 19 | NT | 19 |
| 11 | 1744 | 1053 | 663 | 169.7 | 119 | 148 | 0 | 16 | 94 | 89 | 43 | NT |
| 12 | 1576 | 1000 | 646 | 168.8 | 124 | 150 | 0 | 35 | 100 | 100 | 61 | NT |
| 13 | NT | NT | 2923 | 225 | 143 | 175 | 0* | 9* | 40* | 100* | 26* | 21* |

NT = not tested
*bonds made with an application temperature of 300° F.

TABLE 3

| Sample | 0 hour Viscosity | | 96 hour Viscosity | | 200 hour Viscosity | |
|---|---|---|---|---|---|---|
| | 121° C. (250° F.) | 135° C. (275° F.) | 121° C. (250° F.) | 135° C. (275° F.) | 121° C. (250° F.) | 135° C. (275° F.) |
| 1 | NT | 926 | NT | 956 | NT | 1016 |
| 2 | NT | 887 | NT | 947 | NT | 922 |
| 3 | NT | 882 | NT | 944 | NT | 920 |
| 4 | NT | 1002 | NT | 984 | NT | 961 |
| 5 | NT | 918 | NT | 916 | NT | 908 |
| 6 | NT | 1031 | NT | 996 | NT | 945 |
| 7 | NT | 988 | NT | 951 | NT | 938 |
| 8 | 1215 | NT | 1295 | NT | 1266 | NT |
| 9 | 1256 | NT | 1337 | NT | 1314 | NT |
| 10 | 1382 | NT | 1421 | NT | 1425 | NT |
| 11 | NT | 1053 | NT | 1047 | NT | NT |
| 12 | NT | 1000 | NT | 1000 | NT | NT |
| 13 | NT | 2439* | NT | 2556* | NT | 2777* |

NT = not tested
*Example 13 was tested at 149° C. (300° F.) rather than 135° C. (275° F.)

The compositions of Comparative 1 and Control 1, when observed at 0, 96 and 200 hours, are expected to be clear, and to exhibit no char, gel, skin or edge ring, and an increase in Gardner Color of 3 units at 96 hours and 5 units at 200 hours.

The compositions of Examples 1-10 and 12, when observed at 0, 96 and 200 hours, are expected to be clear, and to exhibit no char, gel, skin or edge ring, and an increase in Gardner Color of 5 units at 96 hours and 7 units at 200 hours.

The composition of Example 11, when observed at 0 hours, is expected to be opaque, and when observed at 96 hours is expected to be opaque and to exhibit no char, some gel, some settling, no skin, no edge ring, and an increase in Gardner Color of 4 units at 96 hours.

The composition of Example 13, when observed at 0 hours, 96 and 200 hours, is expected to be clear, and to exhibit no char, gel, skin or edge ring, and an increase in Gardner Color of 6 units at 96 hours and 9 units at 200 hours.

All patents and patent applications cited in this document are incorporated by reference.

Other embodiments are within the claims.

What is claimed is:

1. A hot melt adhesive composition comprising:
   thermoplastic polymer comprising ethylene copolymer selected from the group consisting of ethylene vinyl acetate, ethylene n-butyl acrylate, ethylene methyl-methacrylate, ethylene ethyl methacrylate, ethylene 2-ethylhexyl acrylate, ethylene methacrylate, ethylene ethylacrylate, and ethylene acrylic acid;
   a first tackifying agent comprising phenol-modified aromatic petroleum hydrocarbon resin; and
   a first wax,
   wherein the composition is free of a vegetable wax and exhibits a viscosity of no greater than about 6000 centipoise at 300° F.

2. The hot melt adhesive composition of claim 1, wherein the composition exhibits a viscosity no greater than about 3500 centipoise at 300° F.

3. The hot melt adhesive composition of claim 1, wherein the composition exhibits at least 40% fiber tear when tested according to the Fiber Tear test method in which the application temperature is no greater than about 300° F. and the test temperature is 120° F.

4. The hot melt adhesive composition of claim 1 further comprising a second tackifying agent different from the first tackifying agent.

5. The hot melt adhesive composition of claim 4, wherein the second tackifying agent comprises at least one of rosin ester, rosin acid, styrenated terpene, terpene-phenolic resin, aliphatic hydrocarbon resin, aromatic-modified aliphatic resin, aromatic hydrocarbon resin, α-methyl styrene resin, hydrogenated hydrocarbon resin and aromatically-modified hydrocarbon resin.

6. The hot melt adhesive composition of claim 1, wherein the first wax is selected from the group consisting of paraffin waxes, Fischer-Tropsch waxes, and combinations thereof.

7. The hot melt adhesive composition of claim 1, wherein the first wax has a needle penetration of no greater that 27 dmm at 25° C.

8. The hot melt adhesive composition of claim 1 further comprising a second wax different from the first wax.

9. The hot melt adhesive composition of claim 8, wherein the second wax is selected from a group consisting of waxes comprising polyethylene, Fischer-Tropsch waxes, microcrystalline waxes, and combinations thereof.

10. The hot melt adhesive composition of claim 1, wherein the composition exhibits a peel adhesion failure temperature of at least 122° F.

11. The hot melt adhesive composition of claim 1, wherein the ethylene-copolymer comprises ethylene vinyl acetate.

12. The hot melt adhesive composition of claim 1, wherein the ethylene-copolymer comprises at least one of ethylene n-butyl acrylate, ethylene methyl-methacrylate, ethylene ethyl methacrylate, ethylene 2-ethylhexyl acrylate, ethylene methacrylate, ethylene ethylacrylate, and ethylene acrylic acid.

13. The hot melt adhesive composition of claim 4, wherein the composition, when heated to a temperature of no more than about 300° F., is clear as determined by the unaided eye.

14. A method of making a construction, the method comprising:
   applying the hot melt adhesive composition of claim 1 on a surface of a first substrate; and
   contacting the applied adhesive composition with a second substrate such that the first substrate is bonded to the second through the adhesive composition and the adhesive composition exhibits a fiber tearing bond to the first and second substrates.

15. The method of claim 14, wherein at least one of the first or second substrates comprises at least one of paperboard, corrugated paperboard, cardboard, and coated cardboard.

16. The method of claim 14, wherein at least one of the first or second substrates comprises at least one of paper and coverstock.

17. A method of packaging an article, the method comprising:
   filling a package with an article; and
   applying the hot melt adhesive composition of claim 1 on a first surface of the package, the package being selected from a group consisting of a case, carton and tray.

18. The method of claim 14, further comprising contacting the applied hot melt adhesive composition with a second surface to achieve at least one of forming a packaging construction and sealing a packaging construction.

19. A packaging construction made by the method of claim 14 in which the packaging construction is selected from a group consisting of a bag, box, carton, case and tray.

20. A hot melt adhesive composition comprising:
   thermoplastic polymer comprising ethylene copolymer selected from the group consisting of ethylene vinyl acetate, ethylene n-butyl acrylate, ethylene methyl-methacrylate, ethylene ethyl methacrylate, ethylene 2-ethylhexyl acrylate, ethylene methacrylate, ethylene ethylacrylate, and ethylene acrylic acid;

a first tackifying agent comprising phenol-modified aromatic petroleum hydrocarbon resin; and a first wax, wherein the composition is free of a vegetable wax, exhibits a peel adhesion failure temperature of at least 122° F. and exhibits a viscosity of no greater than about 6000 centipoise at 300° F.

* * * * *